United States Patent
Allen

(10) Patent No.: US 8,850,441 B2
(45) Date of Patent: *Sep. 30, 2014

(54) LOCK CONTROL IN MULTIPLE PROCESSOR SYSTEMS

(71) Applicant: International Business Machines Corporation, Armonk, NY (US)

(72) Inventor: Gerald Martyn Worsfold Allen, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,308

(22) Filed: Mar. 7, 2013

(65) Prior Publication Data

US 2013/0305253 A1 Nov. 14, 2013

Related U.S. Application Data

(63) Continuation of application No. 13/470,437, filed on May 14, 2012.

(30) Foreign Application Priority Data

May 19, 2011 (EP) ..................................... 11166749

(51) Int. Cl.
*G06F 9/46* (2006.01)
*G06F 9/52* (2006.01)
*G06F 9/48* (2006.01)

(52) U.S. Cl.
CPC .............. *G06F 9/4881* (2013.01); *G06F 9/526* (2013.01)
USPC .......................................... 718/103; 718/102

(58) Field of Classification Search
None
See application file for complete search history.

(56) References Cited

U.S. PATENT DOCUMENTS

| 6,510,437 | B1 * | 1/2003 | Bak et al. ...................... 707/783 |
| 7,093,004 | B2 * | 8/2006 | Bernardin et al. ............ 709/219 |
| 7,844,973 | B1 * | 11/2010 | Dice ............................. 718/108 |
| 8,156,289 | B2 * | 4/2012 | Harper, III .................... 711/147 |
| 8,555,281 | B1 * | 10/2013 | van Dijk et al. .............. 718/100 |
| 2002/0107854 | A1 * | 8/2002 | Hua et al. .......................... 707/8 |
| 2003/0060898 | A1 * | 3/2003 | Jenkins et al. ..................... 700/2 |
| 2003/0061264 | A1 * | 3/2003 | Benhase et al. ............... 709/105 |
| 2004/0216112 | A1 * | 10/2004 | Accapadi et al. ............. 718/103 |
| 2006/0161923 | A1 * | 7/2006 | Ghoman et al. ............. 718/103 |

(Continued)

FOREIGN PATENT DOCUMENTS

EP 2007128168 A1 11/2007

*Primary Examiner* — Emerson Puente
*Assistant Examiner* — Mehran Kamran
(74) *Attorney, Agent, or Firm* — Parashos Kalaitzis; Robert C. Rolnik; David Mims

(57) ABSTRACT

A computer implemented method executing a plurality of tasks, each task comprising threads and each task being assigned a priority from 1 to a whole number greater than 1, each thread of a task assigned the same priority as the task and each thread being executed by a processor. The method also provides locking and unlocking arranged to lock and unlock data stored by a storage device responsive to such a request from a thread. A method of operating the system comprises maintaining a queue of threads that require access to locked data, maintaining an array comprising, for each priority, duration and/or throughput information for threads of the priority, setting a wait flag for a priority in the array according to a predefined algorithm calculated from the duration and/or throughput information in the array.

7 Claims, 6 Drawing Sheets

(56) References Cited

U.S. PATENT DOCUMENTS

| | | | |
|---|---|---|---|
| 2006/0195847 A1* | 8/2006 | Amano et al. | 718/103 |
| 2006/0242648 A1* | 10/2006 | Guccione et al. | 718/105 |
| 2007/0219944 A1* | 9/2007 | Liu et al. | 707/2 |
| 2008/0104600 A1* | 5/2008 | May | 718/103 |
| 2008/0109807 A1* | 5/2008 | Rosenbluth | 718/102 |
| 2009/0144292 A1* | 6/2009 | Collins | 707/10 |
| 2009/0300633 A1* | 12/2009 | Altrichter et al. | 718/103 |
| 2010/0205168 A1* | 8/2010 | Yang et al. | 707/709 |
| 2011/0113431 A1* | 5/2011 | Shidai et al. | 718/103 |
| 2011/0231457 A1* | 9/2011 | Tager et al. | 707/825 |
| 2011/0246998 A1* | 10/2011 | Vaidya et al. | 718/103 |
| 2011/0295811 A1* | 12/2011 | Cherkasova et al. | 707/654 |
| 2012/0005685 A1* | 1/2012 | Chen et al. | 718/104 |
| 2012/0036512 A1* | 2/2012 | Chung et al. | 718/103 |
| 2012/0066683 A1* | 3/2012 | Srinath | 718/102 |
| 2012/0144218 A1* | 6/2012 | Brey et al. | 713/322 |
| 2012/0167101 A1* | 6/2012 | Kandula et al. | 718/102 |

* cited by examiner

26

| P | D | T | W |
|---|----|-----|---|
| 1 | 12 | 535 | 0 |
| 2 | 15 | 428 | 0 |
| 3 | 15 | 420 | 0 |
| 4 | 18 | 370 | 0 |
| 5 | 20 | 320 | 0 |

Fig. 4

```
if TP(x).W = 1 then
 delaying_logic:
 do:
  if TP(x).W = 1 then
   do
    TP(x).W = 0
    wait for an interval
   end loop:
   do i=1 until i=y-1
    if TP(i).T < TP(i+1).T then
     do
      TP(i+1 to y).W = 1
      leave loop
     end
    if TP(i).D > TP(i+1).D then
     do
      TP(i+1 to y).W = 1
      leave loop
     end
   end loop
 end delaying_logic
```

Fig. 5

LOCK CONTROL IN MULTIPLE PROCESSOR SYSTEMS

CROSS-REFERENCE TO RELATED APPLICATIONS

This application claims benefit of priority of Foreign Patent Application No. 11166749.9, filed in European Patent Office on May 19, 2011, which is herein incorporated by reference.

BACKGROUND

This invention relates to a method of operating a system and to the system itself. In one embodiment, the invention provides a solution to throughput constraint of a computer system by means of a hybrid lock and queue which autonomically adjusts.

It is common to provide a computer system that is able to execute multiple tasks in parallel. A task comprises multiple threads and the computer system is also able to execute threads of execution of instructions, which in sequence can correspond to the execution of a single task. A thread has the characteristic of encapsulation of state data concerned with the functions of which it is capable. The computer system is a multiprocessing system in that it has a number of processors and threads can execute on any processor.

The processing of a task can begin by executing instructions on one processor as one thread, then switch to executing another thread on the same processor while the first thread waits. This second thread executes to its completion at which point it signals to the first thread so that it can complete its execution. The capability can extend to provide a virtual execution in parallel of many tasks and many threads.

Additionally such a computer system can be configured so that during execution of a task, where there is a switch of execution to another thread, there may in addition be a switch to another processor instead of execution remaining on the same processor. This can provide a real execution rather than a virtual execution of threads in parallel. The computer system therefore has the overall capability to execute a task by multi-threading execution within the same processor and across multiple processors and this can extend to the execution in parallel of many tasks, many threads and on many processors.

The computer system is provided with a program object that provides a locking capability whereby one thread of execution can ensure exclusive access to a storage area. The execution of all other threads which require to access to a locked storage area have to wait until the lock is released. This locking capability is effective both to threads which execute on the same processor and to those on different processors.

The computer system also has means to allow the throughput of task processing to be controlled and as a result has certain performance characteristics. Tasks can be assigned relative priorities. A high priority task is required to complete execution at the expense of delaying of lower priority tasks which execute in parallel. When a lock becomes free and there are a number of threads waiting for use of the lock, the thread with the highest priority is resumed and given the lock even though it may not have waited the longest duration for its use.

The computer system has a performance characteristic that when a lock is released, threads which execute on the same processor can be resumed with very little processor time overhead. However threads on different processors can be resumed only with a very large processor time overhead. The capabilities and characteristics of this computer system mean that throughput of the computer system as a whole can be constrained by a high number of threads which execute on the same processor and that this constraint cannot be significantly relieved by incorporating the use of more processors due to the very large processor time overhead involved in their exploitation.

It is therefore an object of the invention to improve upon the known art.

BRIEF SUMMARY

According to a first aspect of the present invention, there is provided a method of operating a system comprising a plurality of processors and one or more storage devices, the system arranged to execute a plurality of tasks, each task comprising one or more threads and each task being assigned a priority from 1 to n, each thread of a task being assigned the same priority as the task and each thread being executed by a processor of the system, the system providing lock and unlock functions arranged to lock and unlock data stored by a storage device in response to such a request from a thread, the method comprising the steps of maintaining a queue of threads that require access to locked data, maintaining an array comprising, for each priority, duration and/or throughput information for threads of the respective priority, setting a wait flag for a priority in the array according to a predefined algorithm calculated from the duration and/or throughput information in the array, whenever a thread releases a lock on data, determining if the next thread requiring a lock on the released data is to be executed on the same processor as the thread that released the lock, if so, determining if the wait flag is set in the array for the priority of the next thread, and if so, delaying the execution of the next thread for a predetermined time delay.

According to a second aspect of the present invention, there is provided a system comprising a plurality of processors and one or more storage devices, the system arranged to execute a plurality of tasks, each task comprising one or more threads and each task being assigned a priority from 1 to n, the or each thread of a task being assigned the same priority as the task and each thread being executed by a processor of the system, the system providing lock and unlock functions arranged to lock and unlock data stored by a storage device in response to such a request from a thread, the system further arranged to maintain a queue of threads that require access to locked data, maintain an array comprising, for each priority, duration and/or throughput information for threads of the respective priority, set a wait flag for a priority in the array according to a predefined algorithm calculated from the duration and/or throughput information in the array, whenever a thread releases a lock on data, determine if the next thread requiring a lock on the released data is to be executed on the same processor as the thread that released the lock, if so, determine if the wait flag is set in the array for the priority of the next thread, and if so, delay the execution of the next thread for a predetermined time delay.

According to a third aspect of the present invention, there is provided a computer program product on a computer readable medium for operating a system comprising a plurality of processors and one or more storage devices, the system arranged to execute a plurality of tasks, each task comprising one or more threads and each task being assigned a priority from 1 to n, the or each thread of a task being assigned the same priority as the task and each thread being executed by a processor of the system, the system providing lock and unlock functions arranged to lock and unlock data stored by a storage device in response to such a request from a thread, the product comprising instructions for maintaining a queue of threads that require access to locked data, maintaining an array comprising, for each priority, duration and/or throughput information for threads of the respective priority, setting a wait flag for a priority in the array according to a predefined algorithm calculated from the duration and/or throughput information in the array, whenever a thread releases a lock on data, determining if the next thread requiring a lock on the released data is to be executed on the same processor as the thread that released the lock, if so, determining if the wait flag is set in the array for the priority of the next thread, and if so, delaying the execution of the next thread for a predetermined time delay.

Owing to the invention, it is possible to provide a multi-tasking, multi-threading and multi-processing computer system whose workload throughput would otherwise be constrained as a consequence of a combination of a high level of multi-threading on one processor and a very high processor time overhead to switch between processors by a hybrid locking and queuing capability which autonomically adjusts to optimal throughput. A service is introduced to the computer system which itself executes as a thread and which provides a hybrid locking and queuing function. This service thread can execute on any processor and has state information which can be updated atomically when executing on any processor.

To the caller this capability appears the same as conventional locking and unlocking functions. However, internally the hybrid lock and unlock functions have an autonomic characteristic in that a thread requesting a lock is made to queue or not according to whether its processor and that of the unlocking thread are the same. In addition, the hybrid lock and unlock functions monitor their service times and throughput rates of their callers to determine whether these align with task priorities. If not, the criteria to queue a request for a lock are adjusted as appropriate. When the computer system is processing its workload this autonomic adjustment continues until throughput reaches a steady state.

The queuing process does not incur a very large processor time overhead even though the resumption of a thread on another processor on freeing a lock still does. The result of this hybrid locking and queuing function allows overall throughput of the computer system to be improved by incorporating the use of more processors.

BRIEF DESCRIPTION OF THE SEVERAL VIEWS OF THE DRAWINGS

Embodiments of the present invention will now be described, by way of example only, with reference to the accompanying drawings, in which:

FIG. 4 is a schematic diagram of an array of information;

FIG. 5 is a diagram of the logic of an algorithm; and

DETAILED DESCRIPTION

Figure 1:
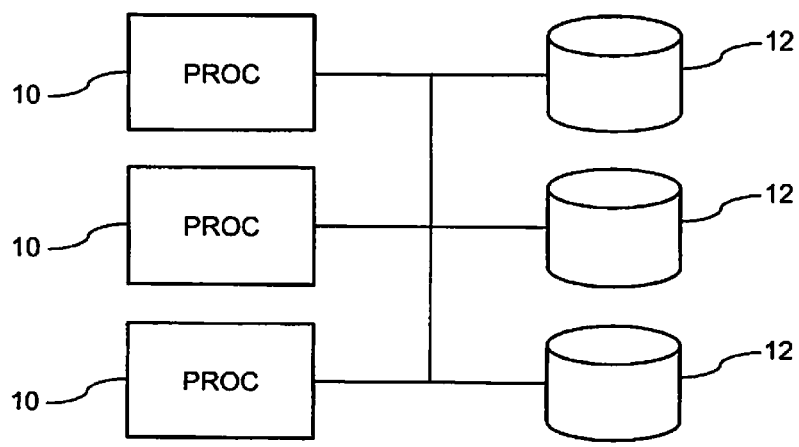
FIG. 1 is a schematic diagram of a computing system.

A computing system comprised of a plurality of processors 10 and a plurality of storage devices 12 is shown in FIG. 1. The system shown in this figure could be a server system that is supporting a very high volume transaction processing system such as those used in the financial industries. For example, a retail bank will provide their customers with a website to access their accounts and perform financial transactions with respect to their accounts. The performance of even simple transactions such as the transfer of money from one account to another requires a large number of instructions to be executed by the processors 10 and the storage devices.

Additionally, the size of many financial institutions is such that they support a very large number of customers, which results in a very large number of transactions being handled at any one time by the institution's website. The computing system must be able to perform a very large number of actions simultaneously, and hence why multiple processors 10 and multiple storage devices 12 are used. The processors 10 may form part of the same physical machine, or may be located in multiple individual machines. Likewise, the storage devices 12 may be part of an overall storage system with additional components provide to mediate the access to the storage devices 12.

The nature of the transactions being carried out by the computer system, in this example financial transactions, means that it is very important that the possibility of errors is minimized, even though a very large number of transactions are being handled simultaneously every second. To this end, even a simple task of carrying out the transfer of money from one account to another will comprise a large number of individual actions that are essentially ensuring that either the transaction completes in its entirety as it is supposed to do so, or the entire transaction is rolled back, if any part of the task fails. See, for example, http://en.wikipedia.org/wiki/Transaction_processing, for more detail.

Figure 2:
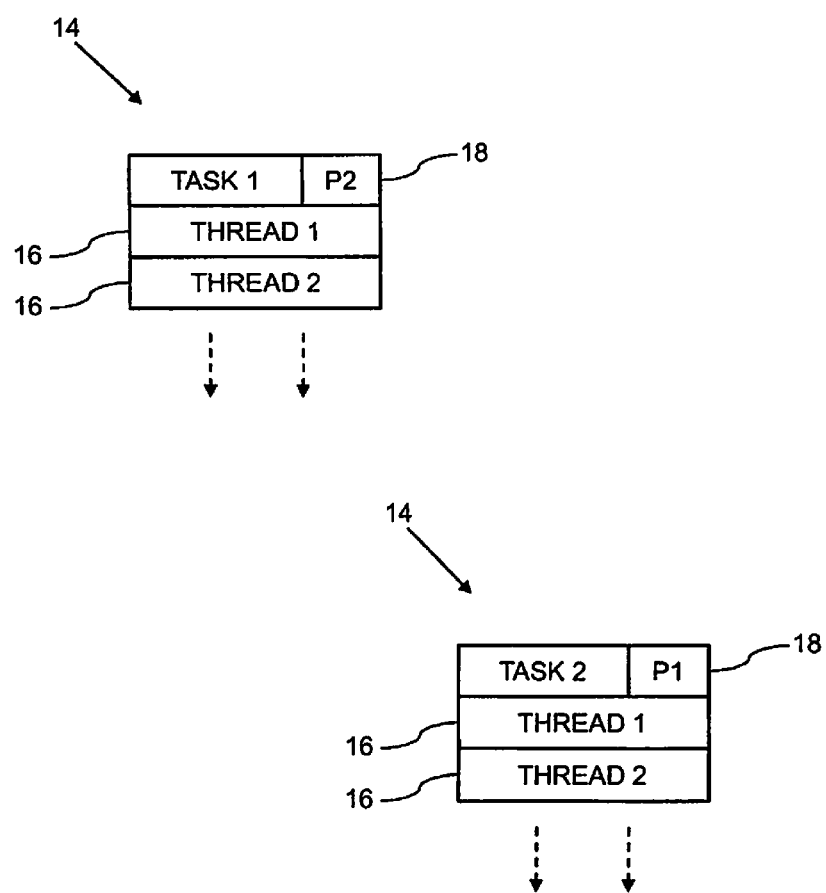
FIG. 2 is a schematic diagram of a pair of tasks.

FIG. 2 shows schematically two individual tasks 14. Each task 14 comprises several threads 16 (quite possible a large number of threads 16) and each task is also assigned a priority 18. The priority 18 of a task 14 is a number from 1 to n, with 1 having the highest priority and a higher number indicating a decreasing level of priority. The value of n will depend upon the nature of the computer system and the overall function that it is implementing, for example. N is a whole number greater than 1, for example, 3 or 5. Each thread 16 of a task 14 is assigned the same priority 18 as the task 14 to which it belongs.

Each thread 16 is executed by a processor 10 of the computer system. The computer system of processors 10 and storage devices 12 is able to execute multiple tasks 14 in parallel. A task 14 comprises multiple threads 16 and the computer system is able to execute threads of execution of instructions which in sequence can correspond to the execution of a single task 14. The computer system is a multiprocessing system in that it has a number of processors 10 and threads 16 can execute on any processor 10. In general the tasks 14 are neutral in terms of which processor 10 is actually used for the execution of that specific task 14.

The processing of a task 14 can begin by executing instructions on one processor 10 as one thread 16, then switch to executing another thread 16 on the same processor 10 while the first thread 16 waits. This second thread 16 executes to its completion at which point it signals to the first thread 16 so that this thread 16 can complete its execution. The capability can extend to provide a virtual execution in parallel of many tasks 14 and many threads 16. The number of processors 10 and the handling of the tasks 14 and threads 16 provide an effective parallel processing of the tasks 14 and allows large numbers of tasks to be completed simultaneously.

Figure 3:
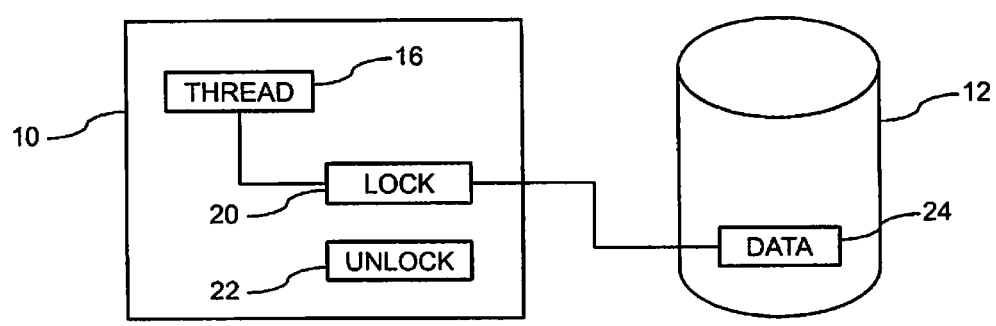
FIG. 3 is a more detailed schematic diagram of a processor and a storage device of the computer system of FIG. 1.

As shown in FIG. 3, the computer system is provided with a locking function 20 and an unlocking function 22. These functions provide a locking capability whereby one thread 16 of execution can ensure exclusive access to a storage area 24. The execution of all other threads 16 which require access to the locked storage area 24 have to wait until the lock is released. This locking capability is effective both to threads 16 which execute on the same processor 10 and to those on different processors 10. The locking functions ensure that data is consistent, for example preventing one thread 16 reading the data 24 while another thread 16 is in the process of changing the data 24.

As mentioned above, the computer system also has means to allow the throughput of task processing to be controlled and as a result has certain performance characteristics in that tasks 14 can be assigned relative priorities. A high priority task is required to complete execution at the expense of delaying of lower priority tasks which execute in parallel. When a lock becomes free and there are a number of threads 16 waiting for use of the lock, then usually, the thread 16 with the highest priority is resumed and given the lock even though it may not have waited the longest duration for the use of the data 24 that has been locked by the locking function 20.

The lock and unlock functions 20 and 22 operate in response to a request from a thread 16. A thread 16 will call the locking function 20 when the thread 16 needs to access the data 24 in such a circumstance that it would be inadvisable for other threads 16 to subsequently access the data 24 while the first thread 16 is still executing. This typically occurs when the thread 16 is likely to change the data 24. Any other thread 16 that then wants to access the data 24, whether for reading or writing purposes, cannot do so while the lock is in place. The computer system will maintain a queue of threads that require access to the locked data.

The lock and unlock functions 20 and 22 provide a calling thread 16 with the capability to obtain a lock or relinquish its use. These functions have their own state information which they maintain. There are also input parameters which the lock and unlock functions can read, and these are to provide adjustable control over their execution characteristics.

The lock function 20 is able to determine a time interval referred to as period queuing. This is the period of time that the thread 16 which called the lock function 20 spent waiting before it was given the lock. The lock function 20 is also able to determine a value referred to as task terminations per interval. This is the number of times a task terminated during a given time interval. The task referred to is one which has a particular priority. The number of task terminations per interval for one task priority can be a different value from the number of task terminations per interval for another task priority. The given time interval is a constant value which is available to be read by the lock function 20.

The unlock function 22 includes logic which, according to certain criteria, can delay the current thread 16 which has just released the lock. This delay is only imposed if the thread 16 which releases the lock and the thread 16 which is about to be given the lock execute on the same processor 10. In addition, the unlock function 22 is also able to cause other threads 16 which execute on behalf of lower priority tasks to wait if their execution characteristics are currently better than higher priority tasks.

The state information includes an array TP defined as "Task Priorities". FIG. 4 gives an example of such an array 26. Each element (row) of the array 26 is composed of the following information: an integer P defined as a unique task priority, a variable D defined as a smoothed average duration, a variable T defined as a smoothed average throughput and a flag W defined as a wait indicator. There are also input parameters which can be read by the lock function 20 and these include a constant m defined as a smoothing delay for duration variable D and a constant n defined as a smoothing delay for throughput variable T.

The integer P is a unique task priority in a single element of the array 26 that is one unique value in the set of all values of task priorities. The variable D (the smoothed average duration) in a single element of the array TP is calculated as follows. When a thread 16 is given use of a lock, the period it spent queuing for the lock is used to update D to a new value D' using the following formula:

$$D'=(\text{period queuing}+D*m)/(m+1)$$

where m is the constant which is appropriate to provide smoothing. The variable T (the smoothed average throughput) is calculated as follows. When a task 14 ends, a count of the tasks 14 terminated for a given time interval may be updated. If at the time of a task termination such an interval has expired and a new interval has begun, a new value of T' is calculated using the following formula:

$$T'=(\text{task terminations per interval}+T*n)/(n+1)$$

Where n is the constant which is appropriate to provide smoothing. The flag W is a Boolean value which indicates a wait is required if its value is 1. The array 26 has its elements ordered according to the values in P with the first element associated with highest priority value of P and the last element with lowest priority value of P. The number of array elements is y.

The state information is used by the lock and unlock functions 20 and 22 in such a way that a thread 16 executing on a given processor 10 can be made to wait for a period so that threads 16 on other processors 10 have their chances of successfully obtaining the lock increased. The unlock function 22 detects whether the next thread 16 to be given the lock is to execute on a different processor 10 to that of the thread 16 which issued the unlock instruction to the function 22. If so, the next thread 16 is given the lock and no further logic is executed. Otherwise when the unlock function 22 is executed on behalf of task x it performs the logic shown in FIG. 5, after freeing the lock.

If the Boolean TP(x)·W (the flag W) is set (i.e. at a value of 1 rather than 0) and the unlock function 22 therefore waits for an interval, this is because it has been made to do so by some other task 14. The logic shown in FIG. 5 executes a loop that detects two conditions. Firstly, whether variable T (the smoothed average throughout) in the array 26 is higher for a lower priority task and secondly whether variable D (the smoothed average duration) in the array 26 is shorter for a lower priority task. If, for each condition there is found to be adjacent array TP elements where either of these conditions are true, all lower priority tasks are made to wait when they subsequently execute the unlock function 22.

The overall effect of this logic is to cause the unlock function 22 to adjust the durations of the execution of tasks 14 according to their respective priorities by delaying those whose execution characteristics do not warrant shorter duration and higher throughput. The wait flag W is set to 1 in the array 26 for those priorities caught by the logic. The effect of a wait flag W being set to 1 is that later, when a queuing thread 16 with such a priority attempts to take a lock that has just been released, then it will be forced to wait for a predetermined time delay. The wait flag will also be reset back to 0 for the specific priority.

Figure 6:
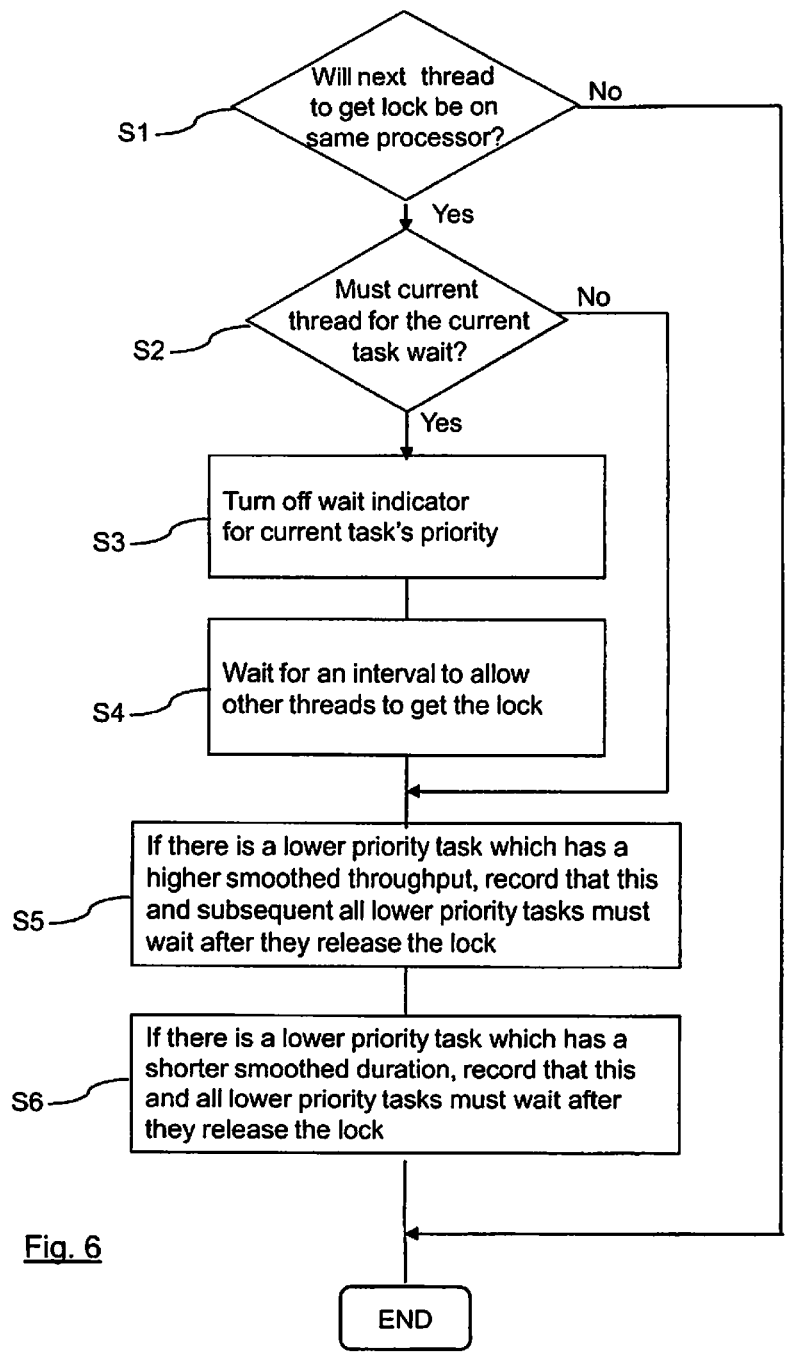
FIG. 6 is a flowchart of method of operating the logic of FIG. 5.

FIG. 6 shows a flowchart which expresses the logic of FIG. 5 in natural language. The algorithm is run whenever a thread 16 releases a lock on data that has been locked. The algorithm can be located within the unlocking function 22, which would carry out the steps shown in this flowchart. The first step S1 is to determine if the next thread 16 requiring a lock on the released data is to be executed on the same processor 10 as the thread 16 that released the lock. If not, then the algorithm terminates. If so, then the process moves on to step S2.

At step S2, it is determined if the wait flag W is set in the array 26 for the priority of the next thread 16 (or the task 14 to which the thread 16 belongs). If no, then the algorithm moves to steps S5 and S6 where the checks are made in relation to the wait flags, described in more detail below. If the wait flag W is set to 1 for the priority of the new thread 16 that wishes to take up the lock, then at step S3, the specific wait flag W is set to 0, and at step S4 the specific thread 16 has its execution delayed for predetermined time period.

At step S5, a cyclic check is performed through the rows of the array 26. Each row of the array 26 is compared to the row below in relation to the smoothed throughput variable T. If any row in the array 26 has a throughput T which is less than the row directly below (comparing row P(i) and P(i+1)) then the row directly below and all other rows below have their wait flag W set to 1. At step S6 a similar cyclic check is performed through the rows of the array 26, but in relation to the smoothed duration variable D. If any row in the array 26 has a duration D which is greater than the row directly below (comparing row P(i) and P(i+1)) then the row directly below and all other rows below have their wait flag W set to 1.

What is claimed is:

1. A method of operating a system comprising a plurality of processors and one or more storage devices, the system arranged to execute a plurality of tasks, each task comprising one or more threads and each task being assigned a priority from 1 to a whole number greater than 1, each thread of a task being assigned a same priority as a corresponding task and each thread being executed by a processor of the system, the system providing lock and unlock functions arranged to lock and unlock data stored by a storage device in response to a request from a requesting thread, the method comprising:
   maintaining a queue of threads that require access to locked data;
   maintaining an array comprising, for each priority, at least one of a duration and a throughput information for threads of the priority, whereby threads having the priority occupy a common position in the array;
   setting a Boolean wait flag for the priority in the array according to a predefined algorithm calculated from the at least one of the duration and the throughput information in the array, wherein throughput information is determined, in part, by using a number of tasks terminated for a time interval;
   responsive to a thread releasing a lock on data, determining that the next thread that requires a lock on the released data is to be executed on a processor for the thread that released the lock;
   responsive to determining that the next thread that requires the lock on the released data is to be executed on the processor for the thread that released the lock, determining that the Boolean wait flag is set in the array for a priority of a next thread; and
   responsive to a determination that the Boolean wait flag is set in the array for a priority of a next thread, delaying execution of the next thread for a predetermined time delay.

2. The method of claim 1 further comprising:
   following the delay of the execution of the next thread for the predetermined time delay, deleting the Boolean wait flag for the priority of the next thread in the array.

3. The method of claim 1, wherein setting the Boolean wait flag for the priority in the array according to the predefined algorithm calculated from the at least one of the duration and throughput information in the array comprises detecting, compared to an array element of a set priority and a corresponding throughput, an array element of a lower priority and a higher throughput, wherein the array element of the set priority and the corresponding throughput and the array element of the lower priority and higher throughput are members of the array.

4. The method of claim 1, wherein setting the Boolean wait flag for the priority in the array according to the predefined algorithm calculated from the at least one of the duration and throughput information in the array comprises detecting, compared to an array element of a set priority and a corresponding duration, an array element of a lower priority and a shorter duration, wherein the array element of the set priority and the corresponding throughput and the array element of the lower priority and shorter duration are members of the array.

5. The method of claim 1 further comprising:
   completing a thread of the one or more threads to form a completed thread, and responsive to completing, updating the array for a priority of the completed thread with a duration and a throughput for the completed thread.

6. The method of claim 5 comprising:
   responsive to updating the array for the priority of the completed thread with the duration and the throughput for the completed thread, applying smoothing to the updating according to a defined formula.

7. The method of claim 1, wherein a completed thread, that corresponds to the priority, completes during a current interval, and wherein the step of setting the Boolean wait flag for the priority in the array according to the predefined algorithm calculated from the at least one of the duration and the throughput information in the array further comprises:
   a) forming a first weighted average of a duration of the completed thread with durations of threads completed prior to the current interval that correspond to the priority during a current interval, such that the completed thread is weighted heavier than each of the threads formerly completed;
   b) assigning the first weighted average as a smoothed duration for the corresponding priority;
   c) forming a second weighted average of a sum of completed tasks during the current interval with sums of completed tasks prior to the current interval that correspond to the priority, such that the completed tasks during the current interval is weighted heavier than each of the sums of completed tasks prior to the current interval;
   d) assigning the second weighted average as a smoothed throughput for the corresponding priority; and
   e) setting a second Boolean wait flag for each of the next lower priorities to the corresponding priority in response to the first weighted average being greater than a weighted average of durations of a next lower priority than the corresponding priority or the second weighted average being lesser than a weighted average of terminations of the next lower priority than the corresponding priority.

* * * * *